A. AST.
ADJUSTABLE PULLEY.
APPLICATION FILED MAR. 16, 1917.

1,237,147.

Patented Aug. 14, 1917.
2 SHEETS—SHEET 1.

WITNESSES
J H Crawford
J W Garner

INVENTOR
Albert Ast,
BY Victor J. Evans
ATTORNEY

A. AST.
ADJUSTABLE PULLEY.
APPLICATION FILED MAR. 16, 1917.

1,237,147.

Patented Aug. 14, 1917.
2 SHEETS—SHEET 2.

WITNESSES
J. H. Crawford
J. W. Garner

INVENTOR
Albert Ast,
BY Victor J. Evans
ATTORNEY

UNITED STATES PATENT OFFICE.

ALBERT AST, OF MORRISVILLE, PENNSYLVANIA.

ADJUSTABLE PULLEY.

1,237,147. Specification of Letters Patent. Patented Aug. 14, 1917.

Application filed March 16, 1917. Serial No. 155,350.

*To all whom it may concern:*

Be it known that I, ALBERT AST, a citizen of the United States, residing at Morrisville, in the county of Bucks and State of Pennsylvania, have invented new and useful Improvements in Adjustable Pulleys, of which the following is a specification.

This invention relates to improvements in pulleys as used for driving machinery and for other like purposes the object of the invention being to provide an improved pulley the diameter of which may be increased or diminished at will, by employing a rim of suitable size in connection with the pulley, and so that the pulley may be adapted for driving a machine at the desired rate of speed without changing the speed of the engine or motor and without the necessity of removing the pulley from its shaft.

Another object of the invention is to provide an improved pulley of this class which is extremely cheap and simple and which may be readily provided with a rim of any suitable diameter.

The invention consists in the construction, combination and arrangement of devices hereinafter described and claimed.

In the accompanying drawings:—

Figure 1:
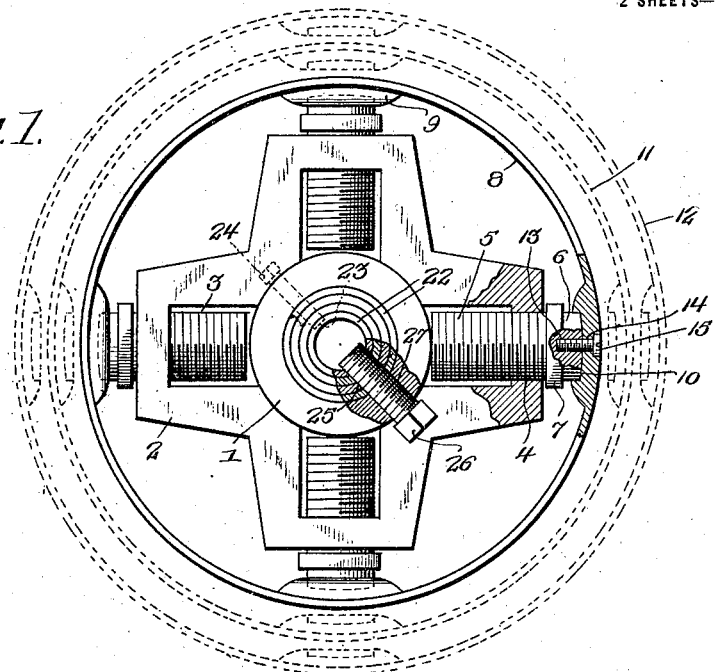
Figure 1 is an elevation partly in section of a pulley constructed and arranged in accordance with my invention the rim of the pulley being indicated in full lines and larger rims, which may be substituted for the used rim, being indicated in dotted lines and arranged concentrically with respect to the pulley.
Figure 2:
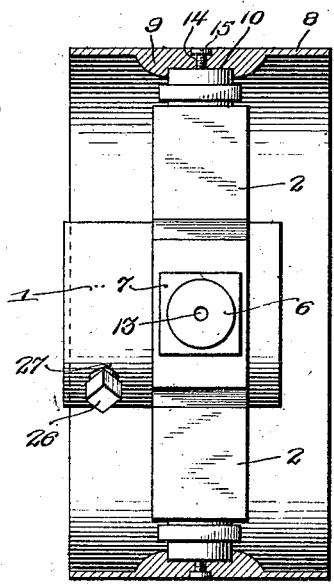
Fig. 2 is partly a plan and partly a sectional view of the same.

In the embodiment of my invention the hub 1 of the pulley is provided with a suitable number of radially arranged arms 2, four of said arms being here shown. Each arm has an opening 3 and is also provided at its outer end with a threaded opening 4. Associated with each hub arm is a radially arranged screw 5 which extends through and engages the threaded opening 4 and is provided with an unthreaded cylindrical outer end 6, each screw being also provided with an angular portion 7 for engagement by a suitable wrench to enable the screw to be readily turned and hence moved outwardly or inwardly.

The rim 8 of the pulley is detachable and is provided on its inner side, at the center, with thickened portions 9 each of which has a circular socket 10 for the reception of the unthreaded outer end of one of the screws. By properly adjusting the screws the rim may be arranged in the required exactly concentric relation to the hub and by turning the screws in the required direction to cause them to move inwardly the outer end 6 of the screws may be disengaged from the sockets 10 to permit the removal of the rim and the substitution therefor of another rim of different size.

Any suitable number of rims of various diameters may be provided according to the desired size of the pulley, as will be understood. In Fig. 1 of the drawings rims 11, 12 are indicated, in addition to the rim 8. Any one of the rims may be placed on and used with connection with the hub and screws of the pulley at will and this may be done very expeditiously and without the necessity of removing the pulley from its shaft.

Each spoke screw has a threaded centrally arranged opening 13 in its outer end and each rim has openings 14 to register with the openings 13. Securing screws 15 are used in said opening to strengthen the connection between the outer ends of the spoke screws and the rim and prevent casual loosening of the spoke screws while the pulley is in use.

The pulley is also provided with a series of bushings 22 of different diameters, the largest of which is fitted in the central opening or bore of the hub, and the other bushings being fitted one within another as shown. Hence the pulley may be placed on shafts of different sizes, one or more of the bushings being used according to the size of the shaft and all of the bushings being discarded when the shaft is of such size as to fit directly in the central opening of the hub. The innermost bushing is provided in its outer side near one end with a seat 23 to receive the inner end of a set screw 24 which operates in a threaded opening in the corresponding end of the hub. Each of the other bushings has an opening for the passage of said screw. Each bushing is also provided with an opening 25. The bushings are arranged in the hub opening with their openings 25 in line with one another, radially so that a set screw 26 which engages a threaded opening 27 of the hub may pass through said opening 25 and engage a notch or groove in the shaft to firmly secure the hub on the shaft.

Figure 3:
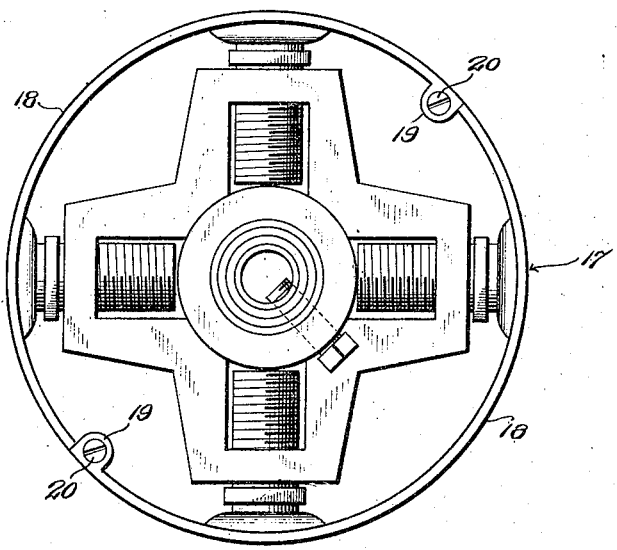
Fig. 3 is an elevation, partly in section, of a modified form of the pulley in which the rim is composed of detachably connected segments.
Figure 4:
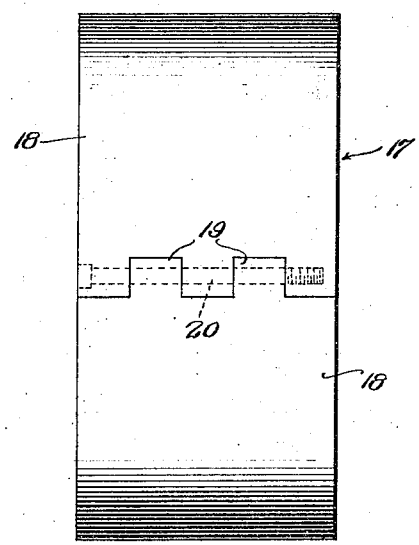
Fig. 4 is a detailed plan of the same.

In Figs. 3 and 4 I show a modification of my invention in which the rim 17 comprises a pair of semi-circular segments 18 which are provided at their opposing, meeting ends with spaced overlapping hinge lugs 19. Bolts 20 are inserted in registering openings which extend transversely through said hinge lugs and coact with the hinge lugs to detachably secure the rim segments together. It will be understood that any suitable number of the rims 17, of different sizes, may in practice be provided and used singly on the pulley according to the desired size of the pulley.

While I have herein described and shown a preferred form of my invention I would have it understood that changes may be made in the form, proportion and construction of the several parts, without departing from the spirit of my invention and within the scope of the appended claims.

Having thus described my invention, what I claim is:—

1. A pulley of the class described comprising a hub having radial arms each provided with a radial threaded opening, radially arranged screws engaged in said threaded openings of the hub arms and each having an unthreaded cylindrical outer end, and a detachable rim having circular sockets on its inner side for the reception of the unthreaded outer ends of the screws.

2. A pulley of the class described comprising a hub having radial arms each provided with a radial threaded opening, radially arranged screws engaged in said threaded openings of the hub arms and each having an unthreaded cylindrical outer end, a detachable rim having circular sockets on its inner side for the reception of the unthreaded outer ends of the screws, and securing screws arranged in openings in the rim and engaged in threaded openings in the outer ends of the first-named screws.

3. A pulley of the class described having a removable rim comprising a plurality of segments, said segments being provided at their opposing meeting ends with spaced overlapped hinge lugs, and bolts extending transversely through the hinge lugs and coacting therewith to detachably secure the rim segments together.

In testimony whereof I affix my signature.

ALBERT AST.

Copies of this patent may be obtained for five cents each, by addressing the "Commissioner of Patents, Washington, D. C."